United States Patent
Yang

(10) Patent No.: US 10,018,281 B2
(45) Date of Patent: Jul. 10, 2018

(54) THROTTLE VALVE

(71) Applicant: Vanguard International Semiconductor Corporation, Hsinchu (TW)

(72) Inventor: Reunn-Chang Yang, Kaohsiung (TW)

(73) Assignee: VANGUARD INTERNATIONAL SEMICONDUCTOR CORPORATION, Hsinchu (TW)

( * ) Notice: Subject to any disclaimer, the term of this patent is extended or adjusted under 35 U.S.C. 154(b) by 33 days.

(21) Appl. No.: 15/184,530

(22) Filed: Jun. 16, 2016

(65) Prior Publication Data
US 2017/0363221 A1 Dec. 21, 2017

(51) Int. Cl.
*F16K 27/12* (2006.01)
*F16K 5/04* (2006.01)
*F16K 5/18* (2006.01)

(52) U.S. Cl.
CPC ............ *F16K 27/12* (2013.01); *F16K 5/0407* (2013.01); *F16K 5/0471* (2013.01); *F16K 5/181* (2013.01)

(58) Field of Classification Search
CPC ...... F16K 27/12; F16K 5/0407; F16K 5/0471; F16K 5/181; F16K 5/12; F16K 5/201; F16K 5/161; F16K 5/18; F16K 5/16; F16K 5/20
USPC ......... 251/205–209, 174, 176, 180–181, 185
See application file for complete search history.

(56) References Cited

U.S. PATENT DOCUMENTS

| 3,382,892 A * | 5/1968 | Cerbin ............... F16L 37/107 137/614.02 |
| 5,413,139 A | 5/1995 | Kusumoto et al. |
| 6,090,206 A * | 7/2000 | Bang .................... F16K 5/12 118/715 |
| 8,166,994 B2 * | 5/2012 | Braga ................. F16K 5/0605 137/15.22 |
| 2013/0240772 A1* | 9/2013 | Lomax ............... F16K 5/0631 251/315.01 |
| 2015/0198255 A1* | 7/2015 | Gamache ............. F16K 3/18 137/1 |

FOREIGN PATENT DOCUMENTS

| CN | 204756055 U | 11/2015 | |
| TW | 201527671 A | 7/2015 | |
| WO | WO 2014022932 A1 * | 2/2014 | .............. F16K 3/18 |

* cited by examiner

*Primary Examiner* — Marina Tietjen
(74) *Attorney, Agent, or Firm* — Birch, Stewart, Kolasch & Birch, LLP

(57) ABSTRACT

A throttle valve is provided, including a throttle valve body, a valve plug, a hollow seal, a cover, a spring, and a bushing. A flow path is formed in the throttle valve body. The valve plug is disposed in the throttle valve body. The degree of opening of the flow path is modified by rotating the valve plug. The hollow seal is disposed in the throttle valve body. The hollow seal abuts the valve plug. The cover is connected to the throttle valve body. An outlet is formed on the cover, the cover comprises a cover flange, and the cover flange surrounds the outlet. The spring abuts the cover flange to apply an elastic force to the hollow seal for tightly contacting the hollow seal with the valve plug. The spring is telescoped on the bushing, and a first end of the bushing pushes the hollow seal.

5 Claims, 4 Drawing Sheets

THROTTLE VALVE

BACKGROUND OF THE INVENTION

Field of the Invention

The present invention relates to a throttle valve, and in particular to a throttle valve that is protected from particle pollution.

Description of the Related Art

The process of depositing layers on a semiconductor wafer (or substrate) usually involves heating the substrate and holding it a short distance from the source of a stream of deposition (or process) gas flowing towards the substrate. The flowing gas reacts and deposits a layer on the heated substrate.

At some point in the vacuum line between the chamber and the vacuum pump, a vacuum shut-off or throttle valve is typically provided which, when closed, acts as a limit of the process chamber containment. Volatile contaminants which are maintained in their vapor state under the high temperatures of the active processing chamber can and do undesirably condense on the walls of the cool vacuum piping some distance from the processing area of the processing chamber, but still within the containment limit of the processing chamber defined by the vacuum valve. During no-flow conditions, these contaminants can migrate back into the processing part of the chamber to undesirably contribute to its contamination. In an attempt to avoid this problem, the inside surfaces within the containment limit of the processing chamber are periodically cleaned by etching (and/or plasma cleaning) these surfaces with a cleaning gas to remove the dielectric material deposited by the deposition gas. Optimization involves extending the time between cleanings as much as possible without introducing defects. Cleaning interferes with the normal production process.

However, pollution in the form of particulate matter is usually deposited on the inner elements of the throttle valve, and this decreases the throttle valve's ability to control air flow. Throttle valves are usually controlled by a stepper motor. When the particle pollution is deposited on the inner elements of the throttle valve, the stepper motor repeatedly modifies the degree of opening of the throttle valve, and the pressure within the processing chamber becomes unstable, decreasing the lifetime of the throttle valve.

BRIEF SUMMARY OF THE INVENTION

In one embodiment, a throttle valve is provided. The throttle valve includes a throttle valve body, a valve plug, a hollow seal, a cover, a spring and a bushing. A flow path is formed in the throttle valve body. The valve plug is disposed in the throttle valve body, wherein the degree of opening of the flow path is modified by rotating the valve plug. The hollow seal is disposed in the throttle valve body, wherein the hollow seal abuts the valve plug. The cover is connected to the throttle valve body, wherein an outlet is formed on the cover, the cover comprises a cover flange, and the cover flange surrounds the outlet. The spring abuts the cover flange to apply an elastic force to the hollow seal for tightly contacting the hollow seal with the valve plug. The spring is telescoped on the bushing, and a first end of the bushing pushes the hollow seal.

In one embodiment, the bushing comprises a bushing flange, an end of the spring abuts the cover flange, and the other end of the spring abuts the bushing flange.

In one embodiment, the bushing flange is formed on the first end.

In one embodiment, the bushing comprises a second end, and the second end passes through the outlet.

In one embodiment, the bushing comprises a bushing through hole, and an aperture of the bushing through hole is smaller than an aperture of the outlet.

In one embodiment, the bushing comprises aluminum alloy.

In one embodiment, the throttle valve body comprises an inlet, and the inlet and the outlet are located on a straight line.

In another embodiment, a throttle valve is provided. The throttle valve includes a throttle valve body, a valve plug, a hollow seal, a cover and a spring. A flow path is formed in the throttle valve body. The valve plug is disposed in the throttle valve body, wherein the degree of opening of the flow path is modified by rotating the valve plug. The hollow seal is disposed in the throttle valve body, wherein the hollow seal abuts the valve plug. The cover is connected to the throttle valve body, wherein an outlet is formed on the cover, the cover comprises a cover flange, and the cover flange surrounds the outlet. The spring abuts the cover flange to apply an elastic force to the hollow seal for tightly contacting the hollow seal with the valve plug.

In one embodiment, a notch is formed on the valve plug. By rotating the valve plug, the position of the notch is changed, and the degree of opening of the flow path is modified. An abutting portion is formed on the hollow seal, and the abutting portion sealably abuts the valve plug.

Utilizing the throttle valve of the second embodiment of the invention, the bushing separates the air flow from the spring and the cover flange. Therefore, the particles are prevented from being deposited on the spring and the cover flange. The outlet of the throttle valve would not be barricaded by the particle deposition, and the degree of opening of the throttle valve is prevented from repeatedly being modified. The stability of the pressure of the processing chamber is improved, and the lifetime of the throttle valve is increased.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
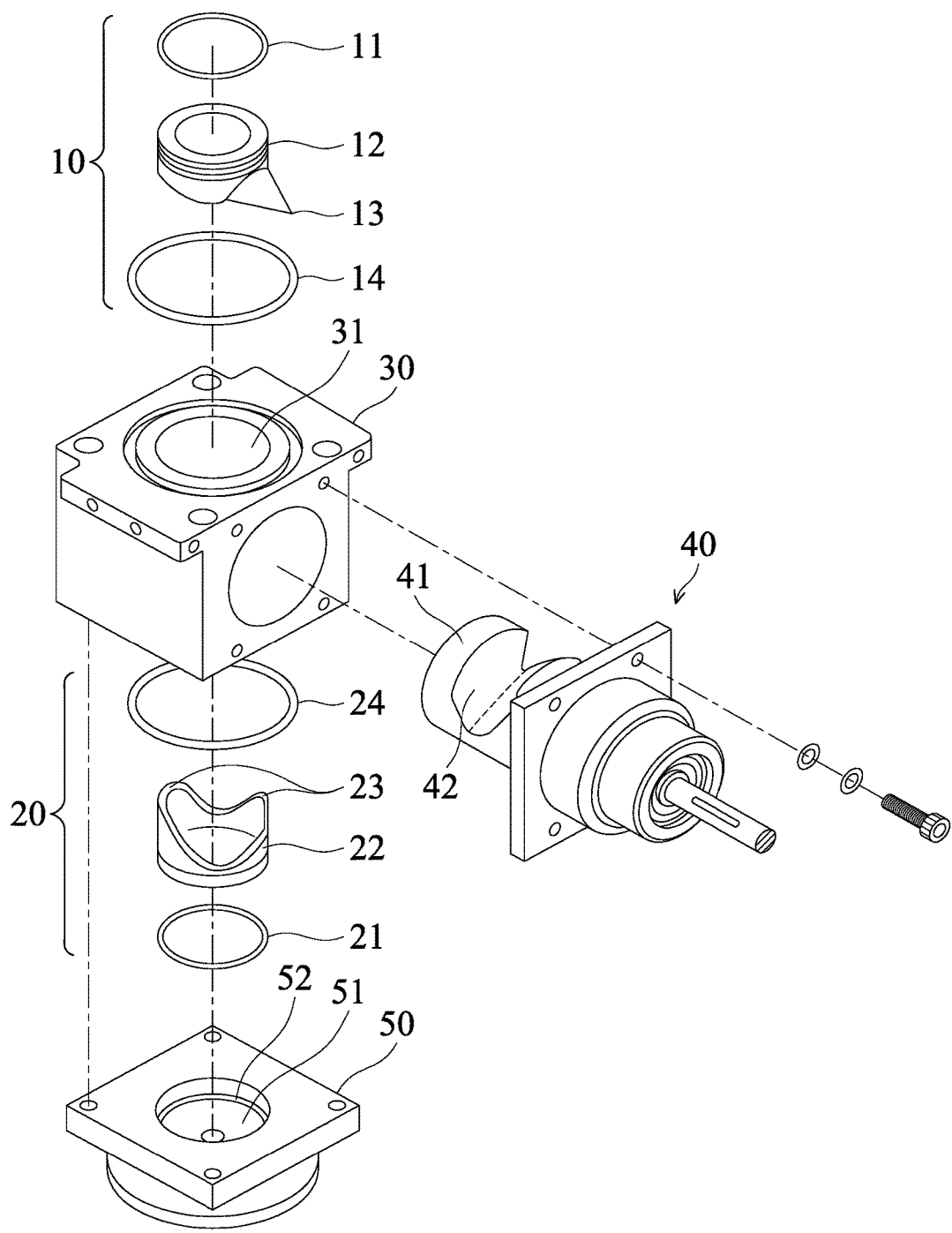
FIG. 1 shows the throttle valve of the first embodiment of the invention.

FIG. 1 shows a throttle valve 1 of a first embodiment of the invention. The throttle valve 1 includes a first connection unit 10, a second connection unit 20, a throttle valve body 30, a valve plug unit 40 and a cover 50. The first connection unit 10 comprises an O-ring 11, a hollow seal 12 and an O-ring 14. The second connection unit 20 comprises an O-ring 21, a hollow seal 22 and an O-ring 24. The throttle valve body 30 comprises an inlet 31. The valve plug unit 40 comprises a valve plug 41, and a notch 42 is formed on the valve plug 41. An outlet 51 is formed on the cover 50. The cover 50 is connected to the throttle valve body 30.

A flow path is formed in the throttle valve body 30 (from the inlet 31 to the outlet 51). In the embodiment, the flow path is straight, and the inlet 31 and the outlet 51 are located on the same straight line. The valve plug 41 is disposed in the throttle valve body 30. By rotating the valve plug 41, the position of the notch 42 is changed, and the degree of opening of the flow path is modified. The O-ring 11 is disposed between the hollow seal 12 and an external pipe (not shown). The O-ring 14 is disposed between the throttle valve body 30 and the external pipe (not shown). The O-ring 21 is disposed between the hollow seal 22 and the cover 50. The O-ring 24 is disposed between the throttle valve body 30 and the cover 50.

The hollow seal 12 comprises an abutting portion 13. The abutting portion 13 has a concave part and a convex part. The abutting portion 13 sealably abuts the valve plug 41. Similarly, the hollow seal 22 comprises an abutting portion 23. The abutting portion 23 has a concave part and a convex part. The abutting portion 23 sealably abuts the valve plug 41.

Figure 2:
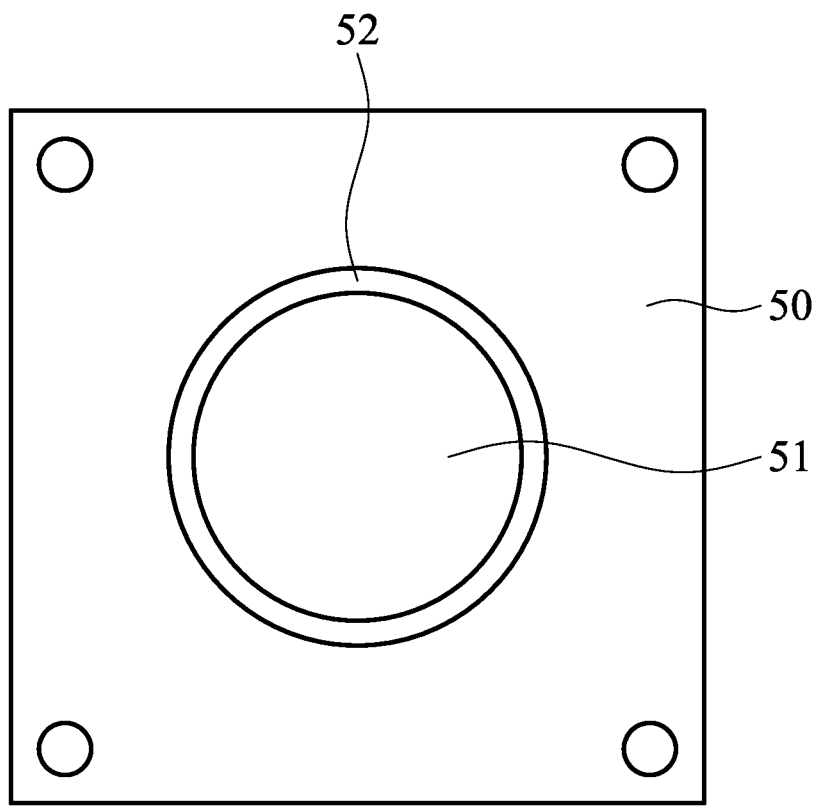
FIG. 2 shows the cover flange of the first embodiment of the invention.

With reference to FIGS. 1 and 2, in the first embodiment, the cover 50 comprises a cover flange 52. The cover flange 52 surrounds the outlet 51, and the particles are therefore prevented from being deposited in the cover flange 52. The outlet of the throttle valve would not be barricaded by the particle deposition, and the degree of opening of the throttle valve is prevented from repeatedly being modified. The stability of the pressure of the processing chamber is improved, and the lifetime of the throttle valve is increased.

Figure 3:
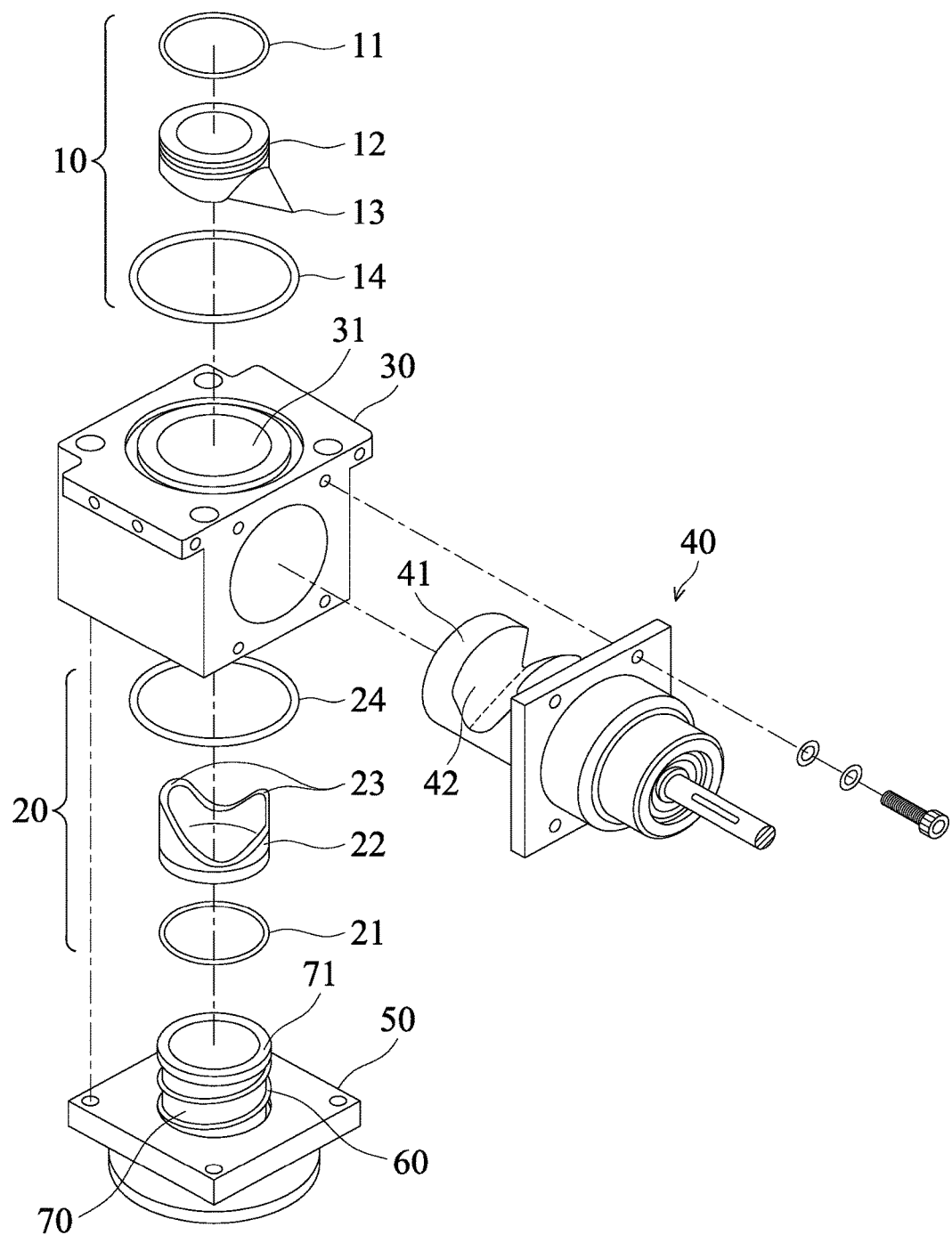
FIG. 3 shows the throttle valve of the second embodiment of the invention.

FIG. 3 shows a throttle valve 2 of a second embodiment of the invention. The throttle valve 2 includes a first connection unit 10, a second connection unit 20, a throttle valve body 30, a valve plug unit 40, a cover 50, a spring 60 and a bushing 70. The first connection unit 10 comprises an O-ring 11, a hollow seal 12 and an O-ring 14. The second connection unit 20 comprises an O-ring 21, a hollow seal 22 and an O-ring 24. The throttle valve body 30 comprises an inlet 31. The valve plug unit 40 comprises a valve plug 41, and a notch 42 is formed on the valve plug 41. An outlet 51 is formed on the cover 50. The cover 50 is connected to the throttle valve body 30.

A flow path is formed in the throttle valve body 30 (from the inlet 31 to the outlet 51). In the embodiment, the flow path is straight, and the inlet 31 and the outlet 51 are located on the same straight line. The valve plug 41 is disposed in the throttle valve body 30. By rotating the valve plug 41, the position of the notch 42 is changed, and the degree of opening of the flow path is modified. The O-ring 11 is disposed between the hollow seal 12 and an external pipe (not shown). The O-ring 14 is disposed between the throttle valve body 30 and the external pipe (not shown). The O-ring 21 is disposed between the hollow seal 22 and the cover 50. The O-ring 24 is disposed between the throttle valve body 30 and the cover 50.

The hollow seal 12 comprises an abutting portion 13. The abutting portion 13 has a concave part and a convex part. The abutting portion 13 sealably abuts the valve plug 41. Similarly, the hollow seal 22 comprises an abutting portion 23. The abutting portion 23 has a concave part and a convex part. The abutting portion 23 sealably abuts the valve plug 41.

The spring 60 abuts the cover flange 52 to apply an elastic force to the hollow seal 22 for tightly contacting the hollow seal 22 with the valve plug 41. The spring 60 is telescoped on the bushing 70, and a first end 71 of the bushing 70 pushes the hollow seal 22. In this embodiment, the first end 71 abuts the O-ring 21.

Figure 4:
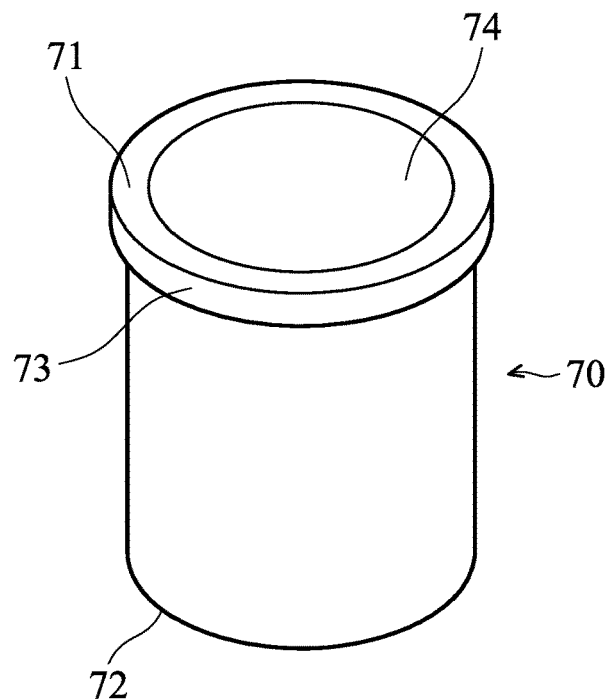
FIG. 4 shows the bushing of the second embodiment of the invention.
Figure 5:
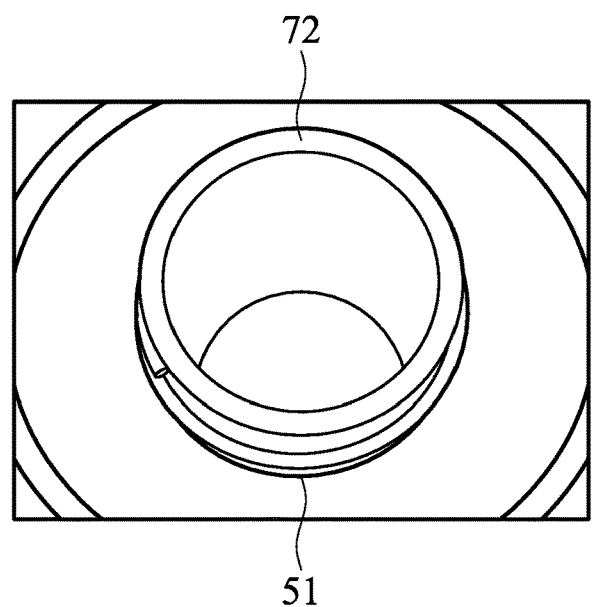
FIG. 5 shows the second end of the bushing of the second embodiment of the invention.

With reference to FIGS. 3 and 4, in this embodiment, the bushing 70 comprises a bushing flange 73. The bushing flange 73 is formed on the first end 71. An end of the spring 60 abuts the cover flange 52. The other end of the spring 60 abuts the bushing flange 73. The bushing 70 further comprises a second end 72. With reference to FIG. 5, in one embodiment, the second end 72 passes through the outlet 51. In one embodiment, the bushing 70 comprises a bushing through hole 74. An aperture of the bushing through hole 74 is smaller than an aperture of the outlet 51.

In one embodiment, the bushing 70 comprises aluminum alloy to improve ozone erosion resistance. The disclosure is not meant to restrict the invention, the bushing 70 can also comprise Teflon or other materials.

Similar to the first embodiment, by designing the width of the cover flange 52, the aperture of the outlet 51 is increased, and the spring 60 can still be sufficiently supported.

Utilizing the throttle valve of the second embodiment of the invention, the bushing separates the air flow from the spring and the cover flange. Therefore, the particles are prevented from being deposited on the spring and the cover flange. The outlet of the throttle valve would not be barricaded by the particle deposition, and the degree of opening of the throttle valve is prevented from repeatedly being modified. The stability of the pressure of the processing chamber is improved, and the lifetime of the throttle valve is increased.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A throttle valve, comprising:
a throttle valve body, wherein a flow path is formed in the throttle valve body;
a valve plug, disposed in the throttle valve body, wherein a degree of opening of the flow path is modified by rotating the valve plug around a plug axis;
a hollow seal, disposed in the throttle valve body, wherein the hollow seal abuts the valve plug in a path direction, wherein the path direction is perpendicular to the plug axis;

a cover, connected to the throttle valve body, wherein an outlet is formed on the cover, the cover comprises a cover flange, and the cover flange surrounds the outlet;

a spring, which abuts the cover flange to apply an elastic force to the hollow seal for tightly contacting the hollow seal with the valve plug; and a bushing, wherein the spring is telescoped on the bushing, and a first end of the bushing pushes the hollow seal, wherein the bushing comprises a bushing flange, an end of the spring abuts the cover flange, and the other end of the spring abuts the bushing flange, and wherein the bushing comprises a second end, and the second end passes through the outlet.

2. The throttle valve as claimed in claim 1, wherein the bushing flange is formed on the first end.

3. The throttle valve as claimed in claim 1, wherein the bushing comprises a bushing through hole, and an aperture of the bushing through hole is smaller than an aperture of the outlet.

4. The throttle valve as claimed in claim 1, wherein the bushing comprises aluminum alloy.

5. The throttle valve as claimed in claim 1, wherein the throttle valve body comprises an inlet, and the inlet and the outlet are located on a straight line.

\* \* \* \* \*